United States Patent
Friedrich

(10) Patent No.: US 10,000,218 B2
(45) Date of Patent: Jun. 19, 2018

(54) BI-MODAL TRAFFIC SYSTEM

(71) Applicant: Johann Friedrich, Altkirchen (DE)

(72) Inventor: Johann Friedrich, Altkirchen (DE)

(*) Notice: Subject to any disclaimer, the term of this patent is extended or adjusted under 35 U.S.C. 154(b) by 0 days. days.

(21) Appl. No.: 14/420,557

(22) PCT Filed: Aug. 10, 2013

(86) PCT No.: PCT/DE2013/100289
§ 371 (c)(1),
(2) Date: Feb. 9, 2015

(87) PCT Pub. No.: WO2015/026674
PCT Pub. Date: Feb. 20, 2014

(65) Prior Publication Data
US 2015/0197255 A1    Jul. 16, 2015

(30) Foreign Application Priority Data
Aug. 15, 2012    (DE) .......... 10 2012 107 489

(51) Int. Cl.
| | |
|---|---|
| *B61B 1/00* | (2006.01) |
| *B60F 1/00* | (2006.01) |
| *B61D 15/00* | (2006.01) |
| *G08G 1/00* | (2006.01) |

(52) U.S. Cl.
CPC ............ *B61B 1/00* (2013.01); *B60F 1/00* (2013.01); *B61D 15/00* (2013.01); *G08G 1/00* (2013.01)

(58) Field of Classification Search
None
See application file for complete search history.

(56) References Cited

U.S. PATENT DOCUMENTS

| | | | |
|---|---|---|---|
| 2,162,351 A | 6/1939 | Main | |
| 4,058,065 A | 11/1977 | Seifert | |
| 6,324,994 B1 | 12/2001 | Glenn | |
| 2004/0250724 A1* | 12/2004 | Sobolewski | B60F 1/02 105/215.1 |

(Continued)

FOREIGN PATENT DOCUMENTS

| | | |
|---|---|---|
| DE | 38 41 092 A1 | 6/1990 |
| DE | 44 31 516 A1 | 7/1996 |

(Continued)

*Primary Examiner* — Rami Khatib
*Assistant Examiner* — Gerrad A Foster

(57) ABSTRACT

Bi-modal traffic system including an integrated path network for bi-modal vehicles, especially for bi-modal trucks, wherein the bi-modal vehicles are configured so that they run both on rail tracks as well as on road tracks. The integrated path network includes at least one rail network and one road network, wherein the at least one rail network and the at least one road network are coupled by at least one junction. The at least one junction is configured so that bi-modal vehicles may change from rail network to a road network and may adapt their speed so that a change of a bi-modal vehicle from the rail network into the road network does not impair the ongoing traffic on the road network, and/or is configured so that bi-modal vehicles may change from a road network to a rail network and may adapt their speed so that a change of a bi-modal vehicle from the road network into the rail network does not impair the ongoing traffic on the rail network.

15 Claims, 3 Drawing Sheets

(56) References Cited

U.S. PATENT DOCUMENTS

2011/0172856 A1* 7/2011 Kull .................. B61L 15/0027
                                                    701/19

FOREIGN PATENT DOCUMENTS

| DE | 10 2004 014 413 | 10/2005 |
|----|-----------------|---------|
| GB | 331 913 A | 7/1930 |
| WO | WO 02/094 589 A2 | 11/2002 |

* cited by examiner

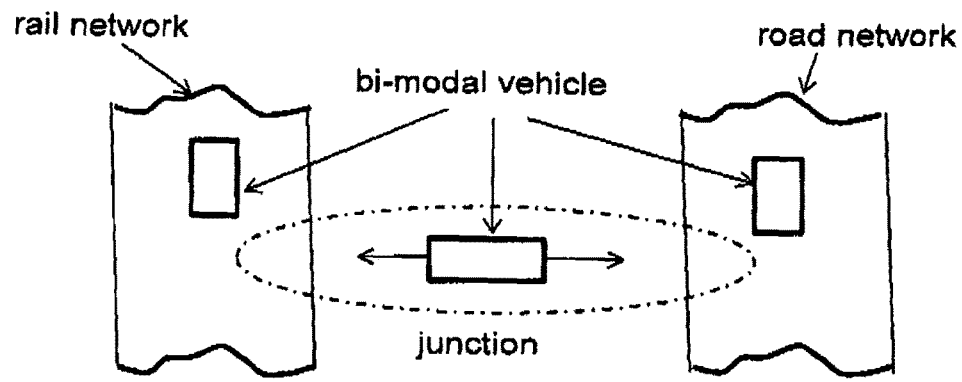
Fig. 1: Integrated path network
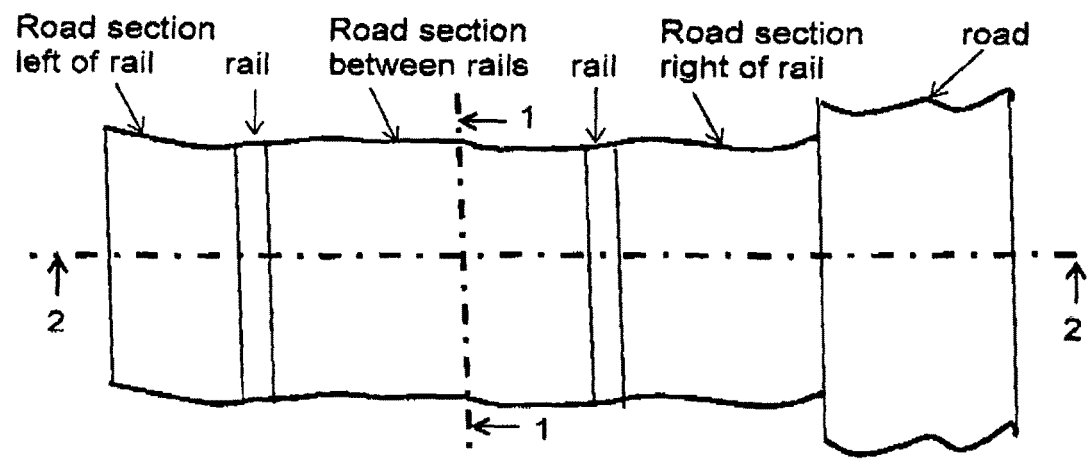
Fig. 2: Junction

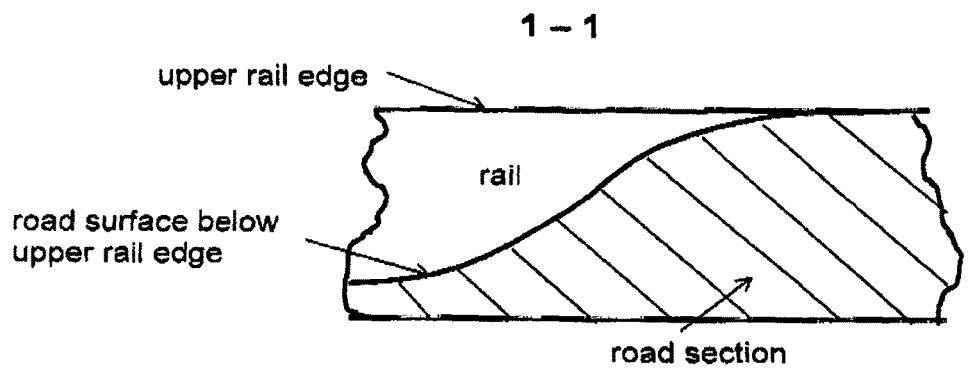
Fig. 3: junction
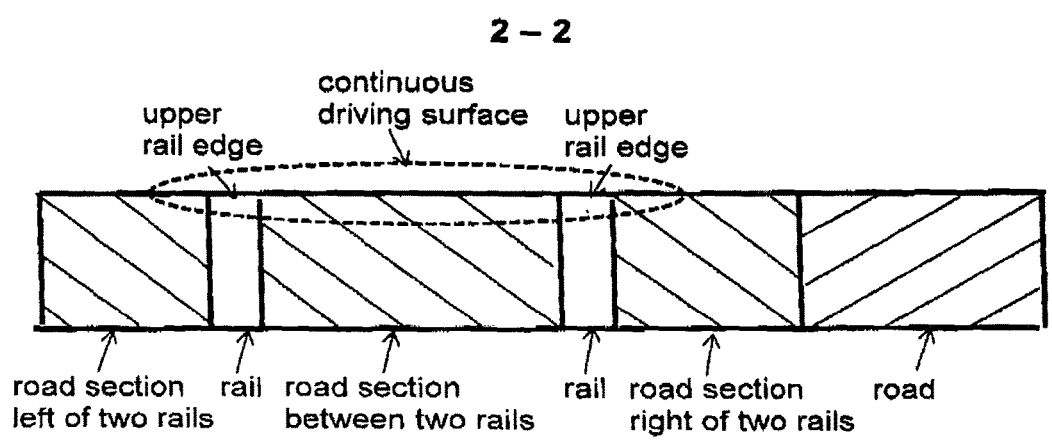
Fig. 4: Change area

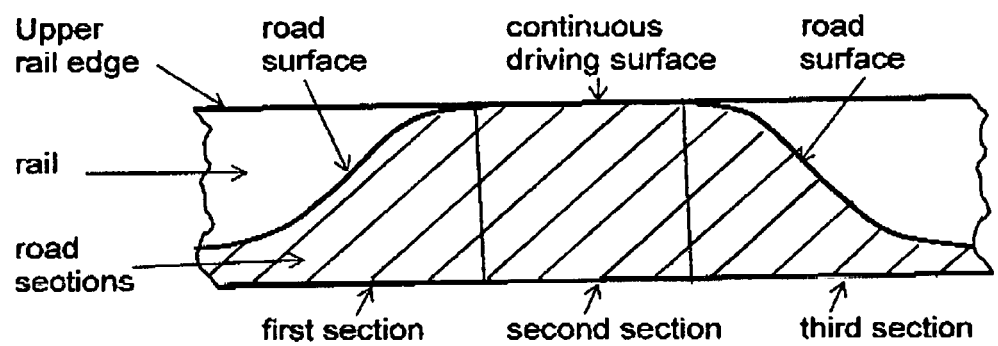
Fig. 5: junction
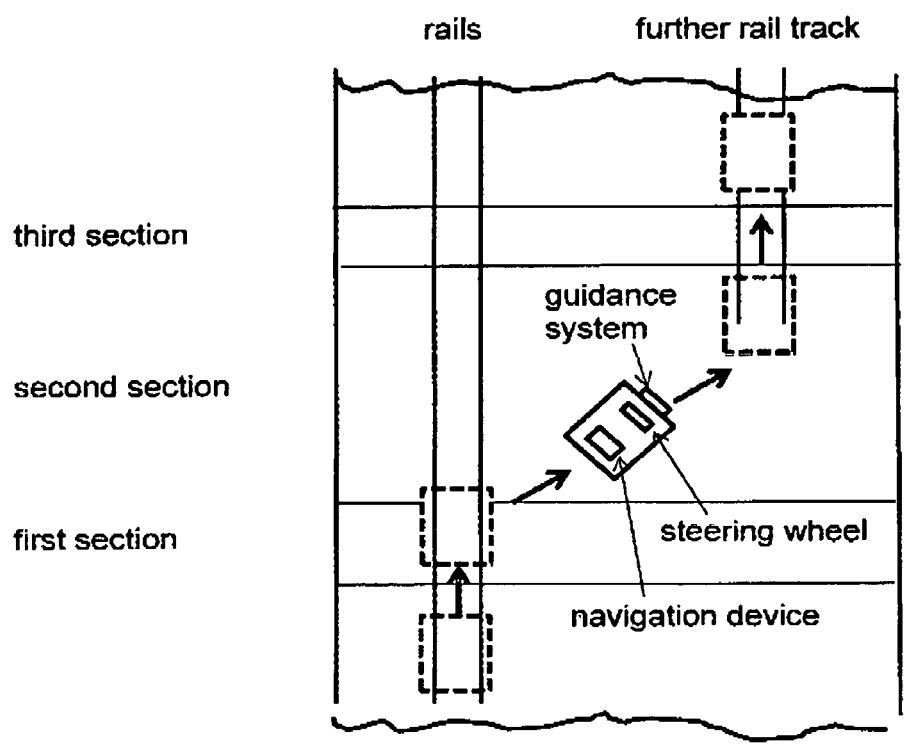
Fig. 6

BI-MODAL TRAFFIC SYSTEM

CROSS-REFERENCE TO RELATED APPLICATIONS

This application claims priority from German Application Number 10 2012 107 489.5, filed Aug. 15, 2012, entitled "BIMODAL TRAFFIC SYSTEM", the teaching of which is incorporated herein by reference.
Problems of Goods Transportation

BACKGROUND OF THE INVENTION

Field of the Invention a) Road Freight Traffic

Description of Related Art

Road freight traffic allows relatively prompt and direct transportation from door to door. Its market share in near and regional areas is dominant and in distant areas is still prevailing. Fuel consumption and emissions of road freight traffic, however, exceed that of rail freight traffic.

The average transport performance per unit of time by road trucks is limited by regulations and traffic impediments. Therefore, the performance-related transport costs are high. Added to that are large expenses for road maintenance and the traffic jams caused by it.

b) Rail Freight Traffic

The average transport performance of rail trucks per unit of time is limited by railway operating regulations and the need for train marshalling. Therefore, a considerably larger number of freight wagons than road trucks are needed for a certain transport performance despite the fact that their payload is several times higher than the payload of ordinary trucks.

The railway network is not comprehensive, therefore goods need to be transported by road trucks to the rails, loaded onto rail wagons, unloaded after rail transport, and then transported to their destination. This is time and cost intensive and despite low traction power requirements on the rail, it is profitable only for transports over long distances.
Object of the Invention

BRIEF SUMMARY OF THE INVENTION is to increase the average speed of ground traffic, especially of freight traffic, and at the same time to significantly reduce the energy requirements for it by an improved use of available rail infrastructure.

A bi-modal traffic system is provided, including an integrated path network for bi-modal vehicles, especially for bi-modal trucks, wherein the bi-modal vehicles are configured so that they run both on rail tracks as well as on road tracks, wherein the integrated path network includes at least one rail network and one road network, wherein the at least one rail network and the at least one road network are coupled by at least one junction. The at least one junction is configured so that bi-modal vehicles may change from rail network to a road network and may adapt their speed so that a change of a bi-modal vehicle from the rail network into the road network does not impair the ongoing traffic on the road network, and/or bi-modal vehicles may change from road network to a rail network and may adapt their speed so that a change of a bi-modal vehicle from the road network into the rail network does not impair the ongoing traffic on the rail network.

In various embodiments, at least one junction for a change of bi-modal vehicles from a rail network to a road network is provided. This junction includes a road section arranged between two rails of the rail network and at least one of a road section arranged to the right of the two rails and a road section arranged to the left of the two rails, where at least one of the road sections arranged to the right or the left is connected with a road. The road sections run alongside the rails and are configured in such a way that the road surfaces of road sections first run below an upper rail-edge so that road wheels of bi-modal vehicles do not touch the road surface, and then the road surfaces of the road sections rise steadily up to the level of the upper rail-edge so that the road wheels gradually get into contact with the road surfaces, whereby the rail wheels are lifted off the rails, the road wheels take over track guiding from the rail wheels, the road surfaces of the road sections and the upper rail-edges form a continuous driving surface and the bi-modal vehicles may change to the road.

In various embodiments, at least one junction for a change of bi-modal vehicles from a road network to a rail network is provided. The junction includes a road section arranged between two rails of the rail network and at least one of a road section arranged to the right of the two rails and a road section arranged to the left of the two rails, wherein at least one of the road sections arranged to the right or left is connected to a road. The road sections run alongside the rails and are configured in such a way that the road surfaces of road sections first run at a level of the upper rail-edge so that the road surfaces of the road sections and the upper rail-edges form a continuous driving surface, and the rail wheels of bi-modal vehicles do not touch the road surfaces and then the road surfaces of the road sections are lowered steadily below the level of the upper rail-edge so that the rail wheels gradually get into contact with the rails, the rail wheels take over track guiding from the road wheels, the road wheels are completely lifted off the road surfaces, and the bi-modal vehicles (may) change to the rail.

In various embodiments, at least one change area, also called rail switch area, is provided. The at least one change area includes one road section arranged between two rails of the rail network and at least one of a road section arranged to the right side of the two rails and a road section arranged to the left of the two rails. The road sections run alongside the rails and include a first section in which the road surfaces of the road sections first run below an upper rail-edge so that road wheels of bi-modal vehicles do not touch the road surfaces, and then the road surfaces of the road sections rise steadily up to the level of the upper rail-edge so that the road wheels of bi-modal vehicles gradually get in contact with the road surface, whereby the rail wheels of bi-modal vehicles are lifted off the rails and the road wheels of bi-modal vehicles take over track guiding from the rail wheels of the bi-modal vehicles. The road sections further include a second section, in which the road surfaces of the road sections run at the level of the upper rail-edge so that the road surfaces of road sections and the upper rail-edges form a continuous driving surface on which vehicles, such as bi-modal vehicles, may cross the rail track and may change their direction from the direction of the rail tracks for example to the direction of a further rail track. The road sections further include a third section, in which the road surfaces of the road sections first run at the level of the upper rail-edge so that rail wheels of bi-modal vehicles do not touch the road surfaces and road surfaces of the road sections are lowered steadily below the upper rail-edge, so that the rail wheels gradually get into contact with the rails, the rail wheels thus taking over the track guiding from road wheels, the road wheels are lifted off from the road surfaces and the bi-modal vehicles change to the rail track, wherein the first section is seamlessly connected with the second section and the second section is seamlessly connected with the third section.

In various embodiments, a positioning system, for example a steering wheel or a guidance system, is provided for positioning the bi-modal vehicle on the continuous driving surface in such a way over the rails that the rail wheels land on the rails after lowering the road surfaces section of road sections.

In various embodiments, bi-modal vehicles for driving on rails and for driving on roads are provided. In various embodiments, the bi-modal vehicles include rail wheels for driving on the rails and road wheels for driving on the road, wherein the rail wheels and the road wheels are driven in such a way that their circumferential speeds are the same.

In various embodiments, the bi-modal vehicles are configured so that the rail wheels not touch the road surface when driving on the road, for example by axles of rail wheels having a greater distance from the road surface than axles of road wheels, or, for example by the rail wheels having a smaller diameter than the road wheels, or both, and the road wheels do not touch the rails when driving on rails, for example by having a diameter that is small enough that the road wheels do not touch the rails or fixing parts of the rails.

In various embodiments, the bi-modal vehicles are configured so that the track gauge of the rail wheels may be adapted to the track gauge of a respective rail network, especially by axial shifting and subsequent fixation of rail wheels on axles on which the rail wheels are mounted, for example while the bi-modal vehicle is on or moves on a road.

In various embodiments, the bi-modal vehicles include a power train which may jointly drive rail wheels and road wheels.

In various embodiments, the bi-modal vehicles include a drive which is operated with traction current on electrified sections of the rail networks for example by sliding contacts and is operated on non-electrified sections of the rail network and on roads with mobile energy for example a battery, an accumulator, a fuel cell or diesel, wherein the power of the drive is manually or automatically kept constant when changing between operating with traction current and mobile energy, for example near junctions or change areas.

In various embodiments, the bi-modal vehicles include for vehicle control at junctions or change areas besides a manual vehicle control, for example using a steering wheel, additionally a first and a second track guidance system, which may be optical or mechanical, wherein the first track guidance system follows a first guide marker arranged on a first side, for example the left side, of the bi-modal vehicle and the second track guidance system follows a second guide marker arranged on a second side, for example the right side, of the bi-modal vehicle.

In various embodiments, the first and the second track guidance systems are both activated before reaching a junction or a change area, wherein when changing direction to the first side, the first track guidance system is activated and the second track guidance system is deactivated until after the change of direction, and wherein when changing direction to the second side, the second track guidance system is activated and the first track guidance system is deactivated until after the change of direction.

In various embodiments, the activation and deactivation of the first and second track guidance systems may be controlled manually, for example by operating a direction indicator or a steering wheel, or be automatically, for example by a navigation system.

In various embodiments, a traffic management and safety system is provided. At least one of an identity, a position, a speed and a change of speed of bi-modal vehicles is transmitted in regular intervals or by interrogation to the traffic management and safety system, wherein the traffic management and safety system is configured to determine at least one of a safety distance, a speed difference and a change in speed difference of a bi-modal vehicle to a bi-modal vehicle ahead or behind and to transmit this to a bi-modal vehicle.

Furthermore, a method for coupling or joining of a rail network and a road network such that vehicles with rail wheels and road wheels, for example a bi-modal vehicle, may change between the rail network and the road network is provided. The method includes the provision or allocation of road sections which run along, for example parallel, the rails of the rail network and on which the vehicle may drive using road wheels, the steady raising of the road surface of the road sections so that the load of the vehicle is gradually transferred from the rail wheels to the road wheels while driving on the rails, and the steady lowering of the road surfaces of the road sections, so that the load of the vehicle is transferred gradually from the road wheels to the rail wheels while driving on the road sections.

In various embodiments, the road surfaces of the road sections are raised far enough and are configured to form a continuous driving surface made up of road surfaces of road sections and upper rail-edges.

In various embodiments, the vehicle positions itself on the continuous driving surface in such a way over the rails that the vehicle drives on the rails using rail wheels when the road surfaces of the road sections are lowered.

In various embodiments, the vehicle may cross the rails driving on the continuous driving surface.

In various embodiments, the road surfaces of the road sections are lowered far enough that the road wheels are no longer in contact with the road sections.

In various embodiments, a track gauge of the rail wheels is adapted to a track gauge of the rail network, for example by axially shifting and subsequent fixation of the rail wheels, wherein the adaptation takes place, for example during driving on the road or while the vehicle is positioned on a road.

BRIEF DESCRIPTION OF THE SEVERAL VIEWS OF THE DRAWINGS

FIG. 1 shows an embodiment of an integrated path network:
FIG. 2 shows an embodiment of a junction;
FIG. 3 shows an embodiment of a junction;
FIG. 4 shows an embodiment of a change area;
FIG. 5 shows an embodiment of a junction; and
FIG. 6 shows an embodiment of a bi-modal traffic system.

DETAILED DESCRIPTION OF THE INVENTION

A bi-modal traffic system may include the following elements:

an integrated path network made up of rail tracks and roads lanes, bi-modal vehicles which may run autonomously, safely and non-stop on various sections of the integrated path network using rail wheels and, respectively, road wheels, a suitable traffic management and safety system.

Integrated Path Network

In an integrated path network, which is also called a bi-modal path network, rail and road networks are connected at suitable connection points, based on the model of motorways, by acceleration and deceleration sections in such a way that bi-modal vehicles may change from the road to the rail and from the rail to the road.

Their speed may be adapted on the acceleration and deceleration sections to the particular required speed on the rail and on the road, respectively. Thus, the ongoing traffic is not impeded by changing between rail and road.

Connection Points/Junctions

For accesses and exits at connection points, which are also called junctions, road driving surfaces at the level of the upper rail-edge are laid between the road and the rails up to the rail area.

Thus, at accesses, bi-modal vehicles may drive up to the rail track area in road-mode and there be exactly positioned over the rails using known optical, electronic, mechanical and/or manual guidance systems, for example lane departure assistant and lane detection. Then, the road surface is lowered in such a way that the rail wheels may safely take over the track guiding from the road wheels and the journey may proceed in rail-mode.

At exits, respective road surfaces are laid in the rail area before connection points in such a way below the upper rail-edge that the road wheels of bi-modal vehicles do not at first touch the road surface. Then, the road surfaces gradually rise to the level of the upper rail-edge. Thereby, the road wheels gradually take over the track guiding from the rail wheels. These are lifted off from the rails and the bi-modal vehicles may change in road-mode from the rail to the road.

Rail Switch Areas/Change Areas

Before reaching rail switch areas, which are also called change areas, bi-modal vehicles first change from rail-mode to road-mode, pass these areas in a controlled manner in road-mode and then change back to the rail-mode. In road-mode, they choose their path autonomously and are independent of the rail switch position.

For changing from rail-mode to road-mode, a respective road surface is laid before rail switch areas in such a way that road wheels do not at first touch the road surface. Then, the road surface gradually rises to the level of the upper rail-edge and the road wheels gradually take over the track guiding from the rail wheels, which are lifted off from the rails.

After passing a rail switch area the road surface is lowered so that the rail wheels regain contact with the rails and may take over vehicle guiding from the road wheels, the road surface ends afterwards.

Topology

The rail network is—like a motorway—free of crossings and rail stations: Crossings are replaced by merging and exit lanes. Rail stations are—like parking areas at motorways—located next to the track. Thus, a high average speed without mutual obstruction of vehicles is ensured.

A strict one-way-traffic is applied, that is, for each direction of travel at least one track is provided, at rail stations there are at least two with corresponding acceleration and deceleration sections.

Bi-Modal Vehicles

Chassis

Bi-modal vehicles are vehicles which have rail wheels on driving on rails and road wheels for driving on roads. The rail wheels turn with the same circumferential speed as the road wheels to enable changing between road- and rail-modes without percussions and to avoid unnecessary wear.

The axles of rail wheels are positioned relatively to the axles of road wheels in such a way that the rail wheels have enough ground clearance during road-mode. However, not so much that they are unable to touch down on the upper rail-edge during rail-mode.

The track gauges of the rail wheels meet the requirements of the respective railway tracks. They may—if necessary—be adapted so that rides on narrow gauge, normal gauge and broad gauges tracks are possible. The gauge of the road wheels is chosen so that their tires do not touch the upper rail-edge during rail-mode.

Power Train

Bi-modal vehicles possess a power train by which rail wheels and road wheels may be jointly driven. During rail-mode, bi-modal vehicles on electrified track sections preferably use traction current as energy source (electric drive).

However, when changing to the road-mode, for example in a rail switch area, the electric circuit is interrupted by lifting the rail wheels off and therefore no traction current is available.

In this case, a change to diesel drive is required unless the electric circuit is closed by a sliding contact on the rail or power is provided by an accumulator.

Track Guidance

Bi-modal vehicles change automatically between road-mode and rail-mode in areas of connection points and of rail switches in order to autonomously pass these areas independent of the current switch position.

The flanges of the rail wheels are not in contact with the rails during road-mode. For precise positioning of the vehicle above the rails and to guarantee a safe transition between road and rail, at least one of known electronic and mechanical track guidance systems is additionally provided for each side of the vehicle to support the driver.

At turnoffs, the track guidance systems of the vehicle side of the turnoff are engaged and those of the other side are disengaged. At a turnoff, for example to the right side, the track guidance systems of the left side are disengaged. After the turnoff they will be reengaged.

The engagement and disengagement of the track guidance systems is controlled manually, for example by activation of a direction indicator or the steering wheel by the driver, or automatically, for example by a navigation system.

Traffic Management and Safety System

Safety Principle

In conventional railway traffic, the responsibility for safety and navigation of railway traffic is borne by central control stations. Thus, the temporal safety distance between individual rail rides amounts to several minutes. This limits the number of possible rail rides per time unit and thus reduces the possibility to shift more road goods transport to the rail.

In a bi-modal goods traffic system, the responsibility for safety and navigation of rail rides is—like in road traffic—delegated to the drivers of the vehicles (principle of subsidiarity).

Therefore, the reaction time of the driver is relevant for the required temporal safety distance, which is normally less than two seconds. The capacity of a rail track corresponds then to that of a single lane motorway and sufficient slots for merging traffic participants may be kept available.

The reaction time may be reduced and the rail track capacity may correspondingly be further increased if a proximity cruise control is used.

Braking Distance

The braking distance on rails is considerably longer than that on roads. This poses no problem for rail vehicles following each other with contact of sight at a temporal safety distance if the leading vehicle cannot brake more heavily than the following one. This one may always adapt its speed in such a way that rear end-collision accidents are avoided.

If there is no contact of sight to a leading vehicle, the speed has to be limited in such a way that the required braking distance does not surpass the respective range of sight. This is unsatisfactory when aiming at high average speeds and the visibility conditions are poor.

For journeys at high speed without contact of sight to a leading vehicle other means are required to safely detect and reduce a critical speed difference between two vehicles following each other.

In a bi-modal traffic system, each vehicle cooperatively transmits its identity, position and speed automatically in short time intervals in well known manner. With these data and the corresponding data of one's own vehicle, the actual speed difference of a vehicle to a leading vehicle as well as its variation may be determined and be displayed to the driver. He may thereupon adapt the speed of his vehicle correspondingly to that of the leading vehicle and safely avoid a rear-end collision. He may be assisted herein by a suitable proximity cruise control.

For reasons of safety, the data of the vehicles are not only evaluated decentralized by the individual vehicles but also by a traffic control center. There, imminent falling shorts in the braking distance between two vehicles are detected and the drivers concerned are warned correspondingly.

Traffic Flow

A smooth flow of traffic is achieved in a bi-modal traffic system by each driver transmitting his destination, for example using a navigation device, to a traffic flow controller before starting his journey. This traffic flow controller calculates the optimal route, generates a conflict-free schedule, transmits it to the navigation system and clears the journey.

The navigation device shows the driver the cleared target schedule according to waypoints and times, as well as the actual position of his vehicle. By a target-actual comparison, the driver is able to always arrange his journey so that he follows the target schedule as closely as possible. For his relief, this may also be carried out by a route management system.

Additionally, data of passing vehicles are gathered alongside the track using suitable sensors and stored in a traffic center. Thus, the route of bi-modal vehicles may be registered and compared with the cleared schedule. In case of target deviations which are critical for an undisturbed traffic flow, the center warns the drivers concerned and, if necessary, modifies the schedules so that a steady traffic flow is maintained.

1. Bi-modal Traffic System characterized by including an integrated path network, bi-modal vehicles and a suitable traffic management and safety system.

2. Integrated path network characterized by rail and road networks being connected at suitable connection points—based on the model of motorways—by acceleration and deceleration sections in such a way that bi-modal vehicles may change from the road to the rail and from the rail to the road and may while doing so adapt their speed in such a way that ongoing traffic on the rail and on the road, respectively, is not impeded.

2.1 Integrated path network according to point 2 characterized by road lanes being laid at connection points in such a way that bi-modal vehicles may pass the area of the connection point autonomously in road-mode.

2.2 Integrated path network according to point 2 characterized by accesses and exits at connection points having road lanes laid between road and rail at the level of the upper rail-edge up to the rail track area.

2.3 Integrated path network according to point 2.2 characterized by bi-modal vehicles being able to readily cross rails in road-mode at access sections near connection points, to drive into the rail track area and to be positioned manually per steering wheel or by driver assistance systems over the rail tracks in such a way, that after lowering the access section, the rail wheels safely take over the track guiding from the road wheels and the journey may be continued in rail-mode.

2.4 Integrated path network according to point 2.2 characterized by laying respective road lanes before exits at connection points in the rail track area in such a way below the upper rail-edge that road wheels of bi-modal vehicles at first do not contact the lane and that then the lanes gradually raise up to the level of the upper rail-edge. Thereby, the road wheels take over step by step the track guidance from the rail wheels. These are completely taken off from the rails and the bi-modal vehicles may change in road-mode from rail to road.

2.5 Integrated path network according to point 2 characterized in that passing-through road lanes are laid at rail switch areas so that bi-modal vehicles may autonomously choose their way through the rail switch area.

2.6 Integrated path network according to point 2.5 characterized in that road lanes before rail switch areas are laid in such a way that the road wheels of bi-modal vehicles at first do not touch these lanes and that these slowly rise to the level of the upper rail-edge, so that the road wheels may take over the track guiding from the rail wheels.

2.7 Integrated path network according to point 2.5 characterized in that the passing-through road lanes are steadily lowered after rail switch areas.

2.8 Integrated path network according to point 2.5 characterized in that after rail switch areas the passing-through road lanes are steadily lowered in a first section so that at first the flanges of the rail wheels get in contact with the rail and the vehicle is precisely positioned over the rails.

2.9 Integrated path network according to point 2.5 characterized in that after rail switch areas the passing-through road lanes are further steadily lowered in a second section so that the rail wheels touch down on the upper rail-edge, fully taking over the guiding function of the road wheels and the vehicles may continue their journey in rail-mode.

2.10 Integrated path network according to point 2 characterized in that in order to achieve a high average speed, crossings are like at connection points replaced by access and exit lanes, stop stations are placed next to the through-lanes and provided with corresponding acceleration and deceleration sections.

2.11 Integrated path network according to point 2.10 characterized in that the through-lanes next to the stop stations are road lanes which may be used by bi-modal vehicles in road-mode, like at connection points.

2.12 Integrated path network according to point 2 characterized in that to achieve a high vehicle throughput and a high level of safety, a strict one-way-traffic is implemented and every traveling direction is provided with its own track.

3. Bi-modal vehicles characterized in that they use rail wheels for travelling on rail tracks (rail-mode) and use road wheels for travelling on road lanes (road-mode).

3.1 Bi-modal vehicles according to point 3 characterized in that rail wheels and road wheels rotate with the circumferential speed.

3.2 Bi-modal vehicles according to point 3 characterized in that the rail wheels are positioned in relation to the road wheels in such a way that they have sufficient ground clearance in road-mode and are able to land on the upper rail-edge in rail-mode.

3.3 Bi-modal vehicles according to point 3.2 characterized in that during road-mode the track gauge of their rail wheels may be easily adapted to respective track gauges by shifting along their axles and respective fixations.

3.4 Bi-modal vehicles according to point 3 characterized by having a power train by which rail wheels and road wheels may be driven jointly.

3.5 Bi-modal vehicles according to point 3.4 characterized by having a power train which enables them to use traction current on electrified rail tracks (electric drive) in a well-known manner during rail-mode and diesel on non-electrified tracks and road (diesel drive) as a source of energy.

3.6 Bi-modal vehicles according to point 3.5 characterized in that changing between electric and diesel drive manually or by a suitable power regulator is executed in such a way that the joint power of electric drive and diesel drive remains constant.

3.7 Bi-modal vehicles according to point 3.6 characterized in that on electrified rail tracks a momentary change between electric and diesel drive, for example in areas of connection-points or rail switches is avoided during road-mode by keeping the traction current circuit closed using a sliding contact on the rail or providing electric power by an accumulator or a fuel cell.

3.8 Bi-modal vehicles according to point 3 characterized in that for safe railing-on and railing-off at connection points and rail switch areas they have beside the option of manual vehicle guidance via a steering wheel additionally for each vehicle side at least one of the well-known electronic and mechanic track guidance systems.

3.9 Bi-modal vehicles according to point 3.8 characterized in that the track guidance systems are always jointly engaged in rail track areas but may be reciprocally engaged and disengaged at turnoffs in such a way that when turning off, for example to the right side, principally the track guidance systems for the right side are engaged and those for the left side are disengaged. After the turnoff, these are engaged again.

3.10 Bi-modal vehicles according to point 3.9 characterized in that the engaging and disengaging of the track guidance systems is controlled manually, for example by activating the direction indicator or the steering wheel or automatically, for example by a navigation device.

4. Traffic control and safety system for bi-modal vehicles characterized in that the responsibility for safety and navigation of rail journeys is—like in road traffic—delegated to the drivers of vehicles (principle of subsidiarity).

4.1 Traffic control and safety system according to point 4 characterized in that bi-modal vehicles automatically report their identity, position and speed in regular intervals or when interrogated in a well known manner.

4.2 Traffic control and safety system according to point 4.1 characterized in that for each bi-modal vehicle the actual difference in speed and its variation with respect to a leading vehicle and a following vehicle is determined from the above reports and so displayed to the driver that he can adapt the speed of his vehicle, that he can avoid an active or passive rear-end collisions and merge his vehicle safely into the traffic flow at connection points and can also safely leave it.

4.3 Traffic control and safety system according to point 4 characterized in that the trip data of bi-modal vehicles are recorded in a well-known manner by sensors along the track and stored centrally.

4.4 Traffic control and safety system according to point 4.1 and point 4.3 characterized in that imminent falling shorts of the required safety distances between two vehicles is determined by a traffic center based on the above reports and the drivers concerned are alerted accordingly.

4.5 Traffic control and safety system according to point 4.1 characterized in that prior to every trip of a bi-modal vehicle the destination is transmitted to a traffic flow center via a navigation device. This traffic flow center calculates the optimal route, generates a conflict-free schedule and transmits it to the navigation device and clears the trip.

4.6 Traffic control and safety system according to point 4.1 characterized in that the navigation device displays to the driver the cleared target schedule according to way-points and times together with the actual position of his vehicle.

4.7 Traffic control and safety system according to point 4.6 characterized in that by comparing the target and actual schedule, the driver is able to arrange his trip to follow the target schedule to the second and may also be assisted by a suitable route-management system in doing so.

4.8 Traffic control and safety system according to point 4.5 characterized in that the trip progress of each bi-modal vehicle—based on the reports according to point 4.1 and point 4.3—is compared by a traffic center with the cleared schedule and in case of schedule deviations critical to a smooth flow of traffic, the drivers concerned are warned and if required their schedules are modified.

The invention claimed is:

1. Bi-modal traffic system, comprising an integrated path network for bi-modal vehicles especially for bi-modal trucks,
    wherein the bi-modal vehicles are configured so that they run both on rail tracks as well as on road tracks,
    wherein the integrated path network comprises at least one rail network and one road network,
    wherein the at least one rail network and the at least one road network are coupled by at least one junction,
    wherein the at least one junction is configured so that
        bi-modal vehicles are able to change from rail network to a road network and are able to adapt their speed so that a change of a bi-modal vehicle from the rail network into the road network does not impair the ongoing traffic on the road network,
    and/or
        bi-modal vehicles are able to change from road network to a rail network and are able to adapt their speed so that a change of a bi-modal vehicle from the road network into the rail network does not impair the ongoing traffic on the rail network;
    the bi-modal traffic system further comprising at least one change area comprising:
        one road section arranged between two rails of the rail network and
        at least one of a road section arranged to the right side of two rails and a road section arranged to the left of two rails, wherein the road sections run alongside the rails and comprise
- a first section, in which the road surfaces of the road sections first run below an upper rail-edge so that road wheels of bi-modal vehicles do not touch the road surfaces, and then the road surfaces of the road sections rise steadily up to the level of the upper rail-edge so that the road wheels of bi-modal vehicles gradually get into contact with the road surface, whereby the rail wheels of bi-modal vehicles are lifted off the rails and the road wheels of bi-modal vehicles take over track guiding from the rail wheels of the bi-modal vehicles,
- a second section, in which the road surfaces of the road sections run at the level of the upper rail-edge so that the road surfaces of road sections and the upper rail-edges form a continuous driving surface on which bi-modal vehicles are able to cross the rail track by and are able to change their direction from the direction of the rail tracks to the direction of a further rail track, and
- a third section, in which the road surfaces of the road sections first run at the level of the upper rail-edge so that rail wheels of bi-modal vehicles do not touch the road surfaces and road surfaces of the road sections are lowered steadily below the upper rail-edge, so that the rail wheels gradually get into contact with the rails, whereby the rail wheels take over the track guiding from the road wheels, the road wheels are lifted off the road surfaces and the bi-modal vehicles change to the rail track, wherein the first section is seamlessly connected with the second section and the second section is seamlessly connected with the third section.

2. Bi-modal traffic system according to claim 1, further comprising:
- a positioning system for positioning the bi-modal vehicle on the continuous driving surface over the rails in such a way that the rail wheels land on the rails after lowering the road surfaces section of road sections, the positioning system being one of a steering wheel and a guidance system.

3. Bi-modal traffic system according to claim 1,
wherein the bi-modal vehicles comprise rail wheels for driving on the rails and road wheels for driving on the road, wherein the rail wheels and the road wheels are driven in such a way that their circumferential speeds are the same.

4. Bi-modal traffic system according to claim 3,
wherein the bi-modal vehicles are configured so that
the rail wheels do not touch the road surface when driving on the road by at least one of axles of rail wheels having a greater distance to the road surface than axles of road wheels and by the rail wheels having a smaller diameter than the road wheels, and the road wheels do not touch the rails or fixing parts of the rails when driving on rails.

5. Bi-modal traffic system according to claim 1,
wherein the bi-modal vehicles are configured so that the track gauge of the rail wheels can be adapted to the track gauge of a respective rail network, especially by axial shifting and subsequent fixation of rail wheels on axles on which the rail wheels are mounted while the bi-modal vehicle is on or moves on a road.

6. Bi-modal traffic system according to one of claim 1, wherein the bi-modal vehicles comprise a power train for jointly driving rail wheels and road wheels.

7. Bi-modal traffic system according to claim 1,
wherein the bi-modal vehicles comprise a drive which is operated with traction current on electrified sections of the rail network, and is operated on non-electrified sections of the rail network and on roads with mobile energy, the mobile energy being one of a battery, an accumulator, a fuel cell and diesel,
wherein the power of the drive is manually or automatically kept constant when changing between operating with traction current and mobile energy near junctions or change areas.

8. Bi-modal traffic system according to claim 1,
wherein the bi-modal vehicles comprise for vehicle control at junctions or change areas besides a steering wheel, additionally a first and a second track guidance system,
wherein the track guidance system is optical or mechanical, wherein the first track guidance system follows a first guide marker arranged on a left side of the bi-modal vehicle and the second track guidance system follows a second guide marker arranged on a right side of the bi-modal vehicle.

9. Bi-modal traffic system according to claim 8,
wherein the first and the second track guidance systems are both activated before reaching a junction or a change area,
wherein when changing direction to the left side, the first track guidance system is activated and the second track guidance system is deactivated until after the change of direction, and
wherein when changing direction to the right side, the second track guidance system is activated and the first track guidance system is deactivated until after the change of direction.

10. Bi-modal traffic system according to claim 8,
wherein the activation and deactivation of the first and second track guidance systems is controlled manually by one of operating a direction indicator and a steering wheel, or is controlled automatically by a navigation device.

11. Bi-modal traffic system according to claim 1, further comprising:
- a traffic management and safety system to which at least one of
  - an identity,
  - a position,
  - a speed, and
  - a change of speed
of bi-modal vehicles is transmitted in regular intervals or by interrogation,
wherein the traffic management and safety system is configured to determine at least one of
- a safety distance,
- a speed difference, and
- a change in speed difference of a bi-modal vehicle to a bi-modal vehicle ahead or behind
and to transmit this to a bi-modal vehicle.

12. Method for coupling a rail network and a road network such that vehicles with rail wheels and road wheels can change between the rail network and the road network, comprising:
- providing road sections running parallel along rails of the rail network and on which the vehicle can drive using road wheels,
- steady raising of road surfaces of the road sections so that the load of the vehicle is gradually transferred from the rail wheels to the road wheels while driving on the rails, wherein the road surfaces of the road sections are raised far enough and are configured to form a continuous driving surface of road surfaces of road sections and rail upper-edges and wherein the vehicle crosses the rails on the continuous driving surface; and steady lowering of road surfaces of the road sections, so that the load of the vehicle is transferred gradually from the road wheels to the rail wheels while driving on the road sections.

13. Method according to claim 12,
wherein the vehicle positions itself on the continuous driving surface over the rails in such a way that it drives on the rails using rail wheels when the road surfaces of the road sections are lowered.

14. Method according to claim 12,
wherein the road surfaces of the road sections are lowered far enough so that the road wheels are no longer in contact with the road sections.

15. Method according to claim 12,
wherein a track gauge of the rail wheels is adapted to a track gauge of the rail network by axially shifting and subsequent fixation of the rail wheels, wherein the adaptation takes place while driving on the road or when the vehicle is on a road.

* * * * *